O. MILLER.
ADJUSTABLE BEARING FOR MOWING MACHINE PITMEN.
APPLICATION FILED APR. 20, 1916.
1,213,773.
Patented Jan. 23, 1917.
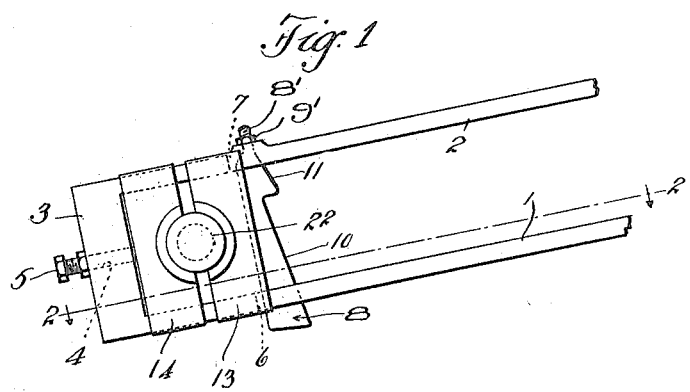
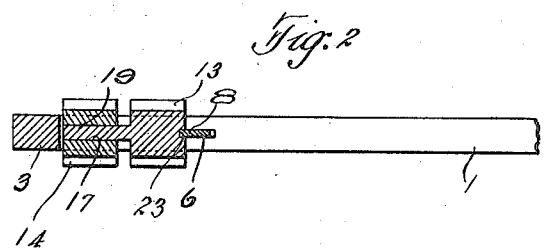
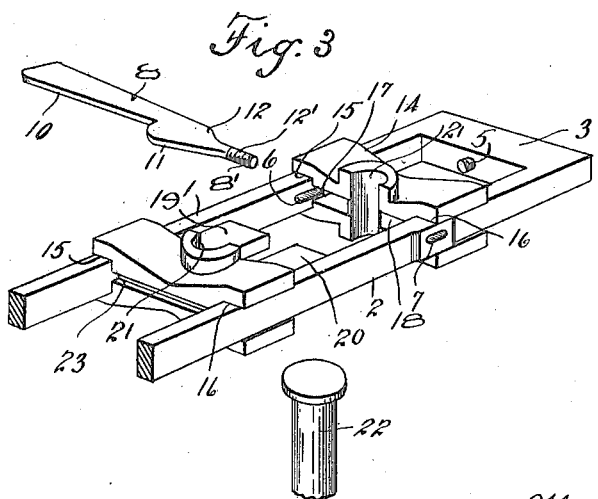
Witnesses
Inventor
Otto Miller ic
UNITED STATES PATENT OFFICE.

OTTO MILLER, OF CRAB ORCHARD, ILLINOIS.

ADJUSTABLE BEARING FOR MOWING-MACHINE PITMEN.

1,213,773.  Specification of Letters Patent.  Patented Jan. 23, 1917.

Application filed April 20, 1916. Serial No. 92,488.

*To all whom it may concern:*

Be it known that I, OTTO MILLER, a citizen of the United States, residing at Crab Orchard, in the county of Williamson and State of Illinois, have invented certain new and useful Improvements in Adjustable Bearings for Mowing-Machine Pitmen; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in bearings and more particularly to bearings used in combination with pitmen employed on mowing machines.

One of the objects of this invention is to provide a bearing of this character which will be capable of adjustment whereby the wear caused by the constant rotation of the shaft operating in the bearing may be compensated for and an even and true fit between the rotating member and the bearing will be maintained throughout the life of the apparatus.

Another object of the invention is to provide a bearing of this character which will present an unbroken or continuous bearing surface, regardless of the diameter of the shaft operating therein.

A still further object of the invention is to provide means for accurately adjusting the bearing sections with relation to each other.

The several objects and such other objects as will appear from the following description are attained in mechanism of the character illustrated in the accompanying drawings, and the invention resides in certain novel features which will be pointed out in the claim following the description.

In the drawings: Figure 1 illustrates a side elevation. Fig. 2 is a longitudinal sectional view taken on line 2—2 of Fig. 1, and Fig. 3 is a detail view of the bearing members before they are moved into engagement with each other to form a complete bearing.

In the drawings, 1 and 2 designate parallel arms of a mowing machine pitman, said arms being connected by a member 3 which is provided with a threaded opening 4 disposed substantially centrally thereof and adapted to accommodate the set screw 5 for purposes to be hereinafter more fully set forth.

Extending transversely through the parallel arms 1 and 2 and arranged diametrically opposite each other are provided elongated openings 6 and 7, adapted to receive adjusting key 8, having the inclined edge 10 which coöperates with the walls of the elongated slot 6 for providing a cam action therebetween, while the inclined wall 11 of the head 12 coöperates with the walls of the opening 7 for providing a cam action. The extreme end 12' of the key 8 is threaded as at 8' which, upon rotation thereof, bears against the arm 2 and moves the key 8 to receive the nut 9'.

The bearing members 13 and 14 are positioned between the parallel arms 1 and 2, and are provided with cut out portions 15 and 16 respectively on opposite sides thereof, said cut out portions forming guideways to permit the bearing members 13 and 14 to move longitudinally of the parallel arms 1 and 2, but at the same time preventing lateral movement thereof. The cut out portions of the bearing member 13 terminate in restricted portions 17 and 18 and provide guideways for the lateral extensions 19 and 20, which provide a continuous bearing surface regardless of the adjustment between the bearing members 13 and 14. Each of the bearing members 13 and 14 is provided with a semicircular cut out portion 21, which coöperate to provide a circular bearing surface for the shaft 22 operating therein. It might further be stated that the bearing member 13 is provided with a groove 23 which accommodates the adjustable key 8 to guide the same into the openings 6 and 7 and prevent lateral movement thereof.

In operation, it will be seen that, when the bearing members 13 and 14 become worn, due to the constant wear between the bearing members 13 and 14 and shaft 22, a slight rotation of the nut 9' causes the inclined surfaces of the key 8 to wedge the bearing member 13 in one direction, while a slight rotation of the set screw 5 causes the bearing member 14 to move in the opposite direction with the result that the wear is compensated for and an even and true bearing results from such adjustment.

It is to be understood that, while I have disclosed the preferred embodiment of my invention, I retain the right to make such changes as I may deem proper within the scope of the appended claim.

What I claim to be new is:—

In an adjustable bearing, supporting arms which are parallel to each other, bearing blocks recessed upon their opposite edges to receive said supporting members and serving to guide the blocks as they are adjusted, one of said blocks having slots therein and the other block provided with integral projections movable within said slots and provided with a transverse slot in its outer edge, the adjacent edge of each block having a bearing surface extending its entire width, the two supporting arms having oppositely disposed slots, a key having a straight edge movable within a slot in one of said blocks and its opposite edge provided with parallel inclined portions adapted to have wedging action against the edges of said slots in the arms, one end of the key being circumferentially threaded, a set screw mounted in a cross-piece connecting said arm and movable against the adjacent edge of the slotted block, and a nut mounted thereon.

In testimony whereof I hereunto affix my signature in presence of two witnesses.

OTTO MILLER.

Witnesses:
MARIE SPRINGS,
DELLA SPRINGS.

Copies of this patent may be obtained for five cents each, by addressing the "Commissioner of Patents, Washington, D. C."